Jan. 6, 1953  W. P. GALLAGHER ET AL  2,624,115
PORTABLE RECIPROCATING CUTTING MACHINE
Filed Aug. 20, 1951  3 Sheets-Sheet 3
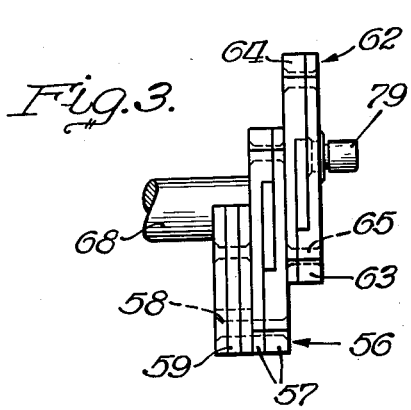
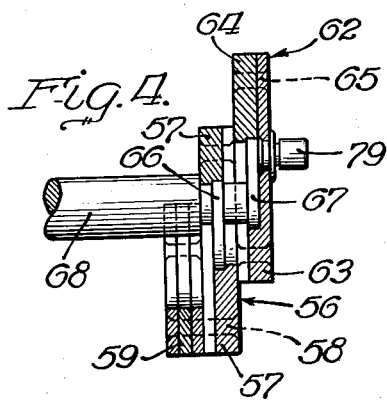
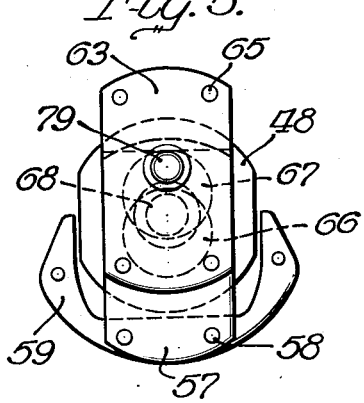
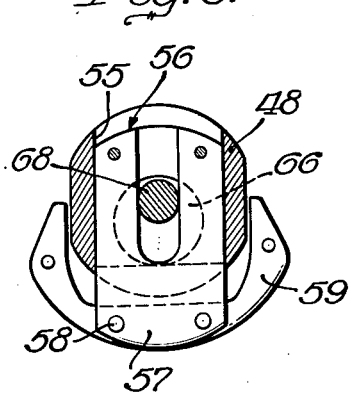
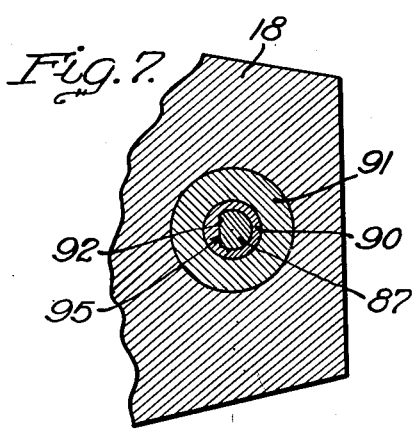
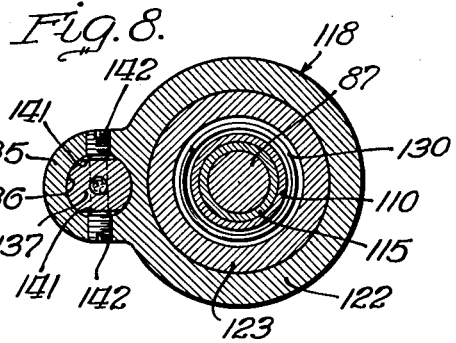
INVENTORS:
William P. Gallagher
Curt J. Courant
BY: Brown, Jackson, Boettcher & Dienner
Attys.

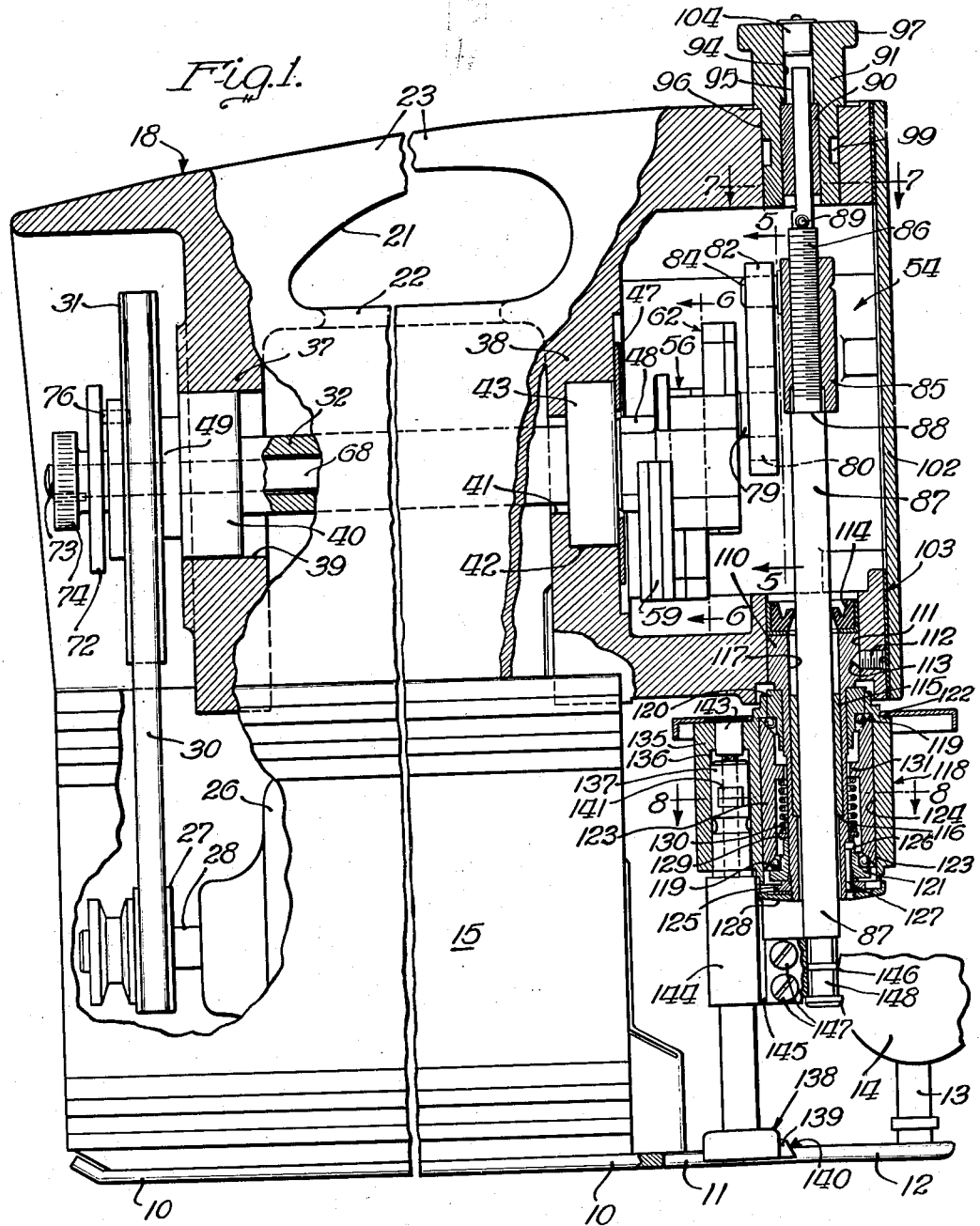

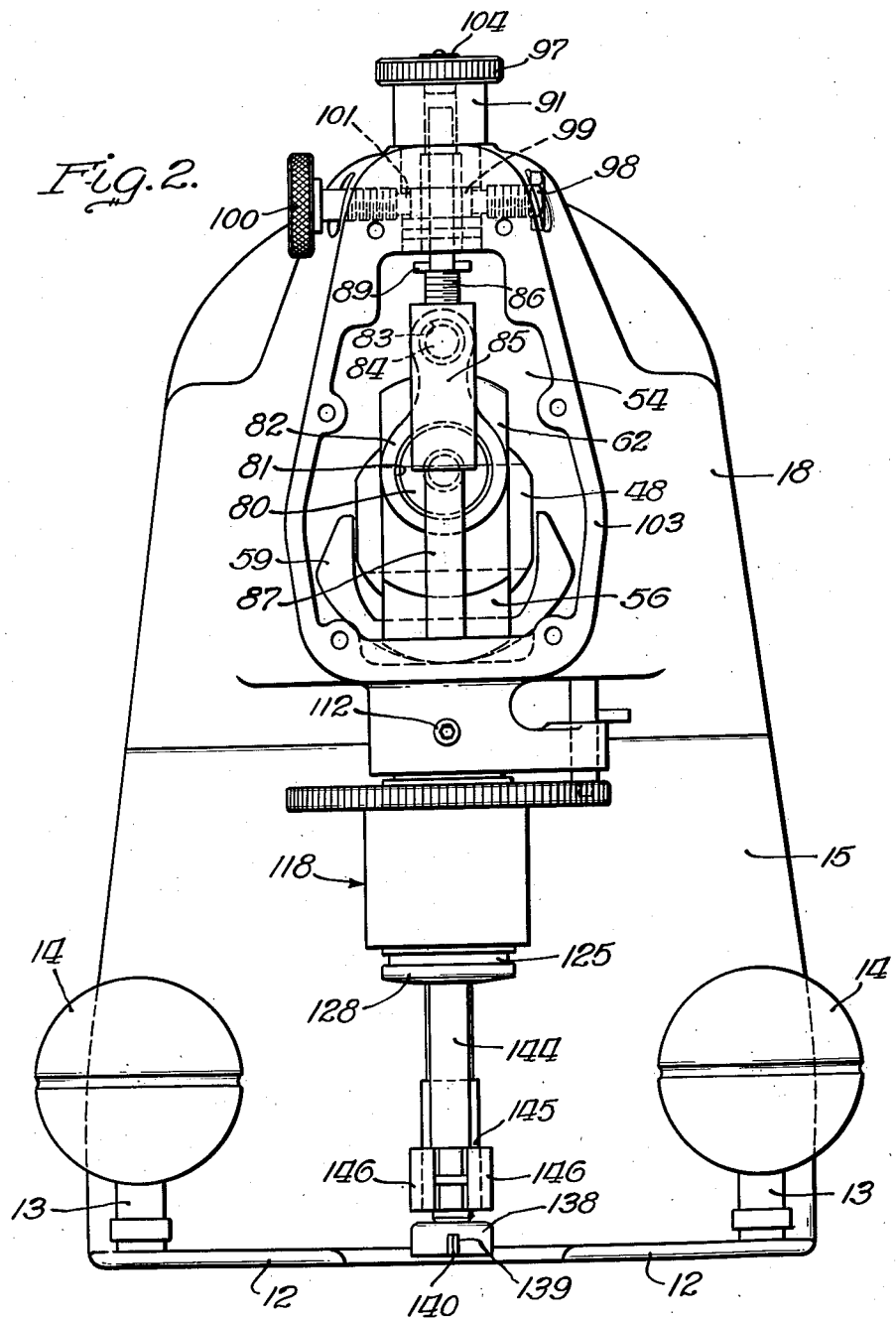

Patented Jan. 6, 1953

2,624,115

UNITED STATES PATENT OFFICE 2,624,115

PORTABLE RECIPROCATING CUTTING MACHINE

William P. Gallagher and Curt J. Courant, Chicago, Ill., assignors to International Register Company, Chicago, Ill., a corporation of Illinois Application August 20, 1951, Serial No. 242,686

10 Claims. (Cl. 30—273)

1

The present invention relates to cutting machines, and has to do with a cutting machine of the type in which the machine is moved over the material and the latter is cut by means of a reciprocating tool connected to a plunger for reciprocation therewith and for swinging movement thereabout, the tool being eccentric to the plunger so as to normally trail the latter in the movement of the machine over the work.

The present invention is in the nature of an improvement over the machine disclosed in Patent No. 2,239,287, to W. P. Gallagher, and the machine disclosed in the copending application of W. P. Gallagher, Serial No. 117,037, filed September 21, 1949.

An object of the present invention is to provide a cutting machine having improved mounting and bearing means for the cutter actuating plunger of the machine and to provide improved operating means for the plunger.

A more specific object of the invention is to provide adjusting elements or controls extending to the exterior of the machine casing for facilitating convenient and rapid adjustment of the disposition and actuation of the plunger and cutter.

Another object is to provide an improved machine construction featuring relatively few parts, all of simple formation, adapted to be readily and conveniently assembled, whereby a sturdy, long-wearing machine of economical manufacture is provided.

A further object of the invention is to provide improved and simplified means permitting, but damping, pivotal movement of the cutter about the actuating plunger when the cutter engages the material to be cut and the machine is moved rapidly over said material.

Further objects and advantages of the present invention will become apparent from the following detailed description of a preferred embodiment of the invention, wherein reference is made to the accompanying drawings, in which:

Figure 1 is a fragmentary side view, partly in elevation and partly in section, of the machine of the present invention;

Figure 2 is an end view, in elevation, taken from the right-hand side of Figure 1, with the cover plate for the cavity containing the plunger actuating mechanism removed;

Figure 3 is a side elevation of an eccentric slide and counterweight assembly forming part of the plunger actuating mechanism;

Figure 4 is a cross sectional side view of the assembly shown in Figure 3;

Figure 5 is an end view, in elevation, of the

2 eccentric slide and counterweight assembly, taken on the line 5—5 of Figure 1;

Figure 6 is a cross sectional view of the eccentric slide and counterweight assembly, taken on the line 6—6 of Figure 1;

Figure 7 is a fragmentary cross sectional view taken substantially along line 7—7 of Figure 1; and Figure 8 is a cross sectional view taken substantially on the line 8—8 of Figure 1.

The machine comprises a base plate 10 of generally rectangular shape having a planar undersurface of considerable area, which supports the machine upon the work for sliding movement thereover. At its forward end, base plate 10 is provided with a substantially V-shaped notch 11, providing two forwardly extending projections 12, to each of which is secured a post 13 having a knob 14 secured upon its upper end. Base plate 10 is suitably secured, conveniently by means of screws, to the bottom of a lower housing section 15. An upper housing section 18 extends over and seats upon the lower section 15 and is secured thereto in a suitable manner, conveniently by screws. Housing section 18 is provided with an elongated forwardly flaring opening 21 in its upper portion, with a top wall 22 below the opening 21, a portion 23 of section 18 above the opening 21 providing a convenient handle for lifting and carrying the machine. Sections 15 and 18 together form a housing within which the working parts of the machine are mounted.

An electric motor 26, preferably a universal motor, is suitably secured, conveniently by means of screws, on the upper face of the base plate 10. A pulley 27, which is preferably a two speed pulley as shown, is splined on shaft 28 of the motor 26 for rotation with the shaft. The pulley 27 receives a V belt 30 which passes about a V pulley 31 of known type which is suitably secured on the rearward end of a tubular shaft 32. The belt 30 may be maintained under proper tension by means of a belt tightener (not shown). Provision for driving the motor 26 at various speeds may be made in a customary manner if desired to render it possible to drive the shaft 32 at different speeds to suit requirements.

The upper housing section 18 is provided with two interior relatively thick webs 37 and 38, defining annular supports spaced apart lengthwise of housing station 18 and disposed coaxially with their common axis in the central transverse vertical plane of housing section 18. The web 37 is provided with an enlarged bore 39 within which is received a bearing 40, which may be either a roller bearing or a ball bearing, for supporting the rearward end portion of the hollow shaft 32. The bearing 40 may be retained in the bore 39 in a customary manner, such as by press-fitting the outer race of the bearing in the bore. The web 38 is provided with a reduced bore 41 through which the shaft 32 passes and a counterbore 42, of approximately the same size as the bore 39, within which is received a bearing 43, which may be either a roller bearing or a ball bearing, for supporting the forward portion of the shaft 32. The outer race of the bearing 43 may be press fit in the counterbore 42 or an annular plate 47 may be suitably secured to the exterior surface of the web 38 to retain the bearing 43 in the counterbore 42. A head 48 is secured upon the forward end of shaft 32 and contacts the inner race of the bearing 43, as will be understood. A lock nut 49 is screwed upon the rearward portion of shaft 32 and contacts the inner race of bearing 40. The shaft 32 is thus confined against endwise movement and is rotatably mounted in the bearings.

The head 48 is disposed within a compartment or cavity 54 at the front of the upper housing section 18. The head 48 is provided with a diametrical groove 55 (Figure 6) of considerable width opening from its outer face. A counterweight block 56 is slidably mounted in groove 55 and seats against head 48 at the inner or rearward side of groove 55. Referring to Figures 3 to 6, the block 56 is of approximately oblong shape and of laminated construction. It comprises two plates 57 secured together by rivets 58, or in other suitable manner. A counterweight 59, also of laminated construction, is secured to one end of the counterweight block 56, conveniently by the rivets 58, additional rivets being provided for securing the laminations of the counterweight 59 together. Preferably, the counterweight 59 is of arcuate shape and extends about the head 48 for movement transversely thereof toward and away from shaft 32.

A crank pin block 62 is slidable in groove 55 of head 48 at the outer face of the counterweight block 56. The block 62 is of substantially the same shape as the block 56 and comprises an outer plate 63 and an inner plate 64 connected to plate 63 by means of rivets 65, or in other suitable manner. The blocks 56 and 62 receive, between the plates thereof, two oppositely disposed eccentrics 66 and 67, respectively, suitably secured upon an adjusting rod 68 extending through shaft 32. Under certain conditions, which will be explained presently, the rod 68 is rotatable relative to the shaft 32 for varying the angular relation of the eccentrics 66 and 67 with respect to the blocks 56 and 62. As will be clear from what has been said, both plates of block 56 and the inner plate 63 of block 62 are slotted lengthwise to accommodate adjusting rod 68 and relative movement of blocks 56 and 62 transversely of the head 48. The eccentrics 66 and 67 contact the end walls or plates of the blocks 56 and 62, respectively, as shown and as will be clear from what has been said. By turning the rod 68 in proper direction, the blocks 56 and 62 may be adjusted in opposite relation and simultaneously and to equal extent toward and away from the axis of shaft 32 along the diameter thereof. The blocks 56 and 62, the head 48, the counterweight 59, the eccentrics 66 and 67 and the rod 68 form an eccentric slide and counterweight assembly which is effective, as will presently appear, to vary the stroke of the cutter actuating plunger. As is apparent from the foregoing description, the formation and assembly of the various elements of the eccentric slide and counterweight assembly is relatively simple, and the assembly of the elements may be readily and conveniently accomplished.

An annular adjusting plate 72 is non-rotatably mounted upon the rearward end portion of rod 68 on a stud 73 extending from the rearward end of rod 68. A thumb nut 74, screwing on the stud 73, normally holds plate 72 tightly against the rearward end of shaft 32, this nut 74 providing means for forcing rod 68 rearward through tubular shaft 32 so as to clamp the blocks 56 and 62 tightly within head 48 by means of the eccentrics 66 and 67, in an obvious manner, block 62 preferably being provided with beveled shoulders which seat against corresponding beveled surfaces of head 48 in binding contact therewith. The adjusting plate 72 is provided with an arcuate slot (not shown) concentric with shaft 32, this slot being provided with a series of notches opening from its inner edge. These notches are adapted to receive the inner portion of a pin 76 secured in the hub of pulley 31 and projecting rearward therefrom, this pin projecting through the slot in the plate 72. By turning nut 74 off of stud 73 to proper extent, the adjusting plate may be moved rearward sufficiently to be disengaged from pin 76, after which, by holding pulley 31 and turning plate 74, rod 68 may be turned so as to vary its angular relation to shaft 32 and effect desired adjustment of the slidable blocks 56 and 62. After the desired adjustment has been effected, plate 72 is returned to normal position, with the pin 76 engaging in a notch of the slot in the plate corresponding to the adjustment made, after which nut 74 is turned tightly onto stud 73 for locking the parts together in the manner previously described. It will be seen that the pin 76 and the adjusting plate 72 provide a positive driving connection between rod 68 and shaft 32, assuring rotation of the rod with the shaft and precluding the possibility of casual variation in the angular relation therebetween.

A crank pin 79 is secured to, preferably formed integral with, the outer or forward arm of plate 63 of the crank pin block 62. The crank pin 79 is disposed to one side of the axis of shaft 32, which axis coincides with the axis of the adjusting rod 68, and extends forwardly from plate 63. The crank pin 79 fits within the inner race of a ball bearing 80 mounted in an enlarged bore 81 in a crank arm 82. The crank arm 82 is provided at its opposite end with a bore 83 within which a pin 84, formed integrally with a sleeve 85, is received. The sleeve 85 is internally threaded for the reception of a threaded portion 86 of a cutter actuating plunger 87. The plunger 87 is reciprocated by the mechanism just described to effect reciprocation of the cutting tool. To effect adjustment of the disposition of the plunger motion translating means are provided in the form of the threaded sleeve and plunger. As the plunger 87 is rotated with respect to the sleeve 85, relative linear movement takes place to move the plunger toward or away from the work. Movement of the plunger is limited in one direction by a shoulder 88 formed on the plunger 87 adapted to engage the lower end of the sleeve 85, and in the other direction by a split pin or key 89 extending through the plunger 87 adapted to engage the upper surface of the sleeve 85.

The plunger 87 is mounted and guided for reciprocal movement at its upper end in a bearing 90, which is preferably in the form of a tubular bushing positioned within a sleeve 91. Referring to Figure 7, the bearing 90 is provided with a D-shaped hole or bore 92 and the plunger 87 is slabbed away, as at 95, for engagement within the D-shaped bore 92 to lock the bearing 90 and plunger 87 together for rotational movement, but permitting relative reciprocal movement between the bearing and the plunger. The bearing 90 is suitably secured or locked to the sleeve 91, such as being press-fitted into the bore 94 of the sleeve 91. The sleeve is rotatably mounted in a bore 96 in the housing section 18 and extends to the exterior of the housing section 18 where it is provided with a knurled flange 97 for engagement by the fingers of an operator. A screw 98 extending laterally of the sleeve 91 (Figure 2) engages in a circumferential groove 99 in the sleeve 91 to prevent relative linear movement between the sleeve and the housing section 18, but allowing rotational movement of the sleeve 91. Diametrically opposite the screw 98, a knurled thumb screw 100 extends radially of the sleeve 91 and is provided with a point 101 arranged to engage in the circumferential groove 99 and adapted to be tightly engaged with the bottom wall of the groove 99 to prevent rotation of the sleeve 91. In operation, the machine operator loosens the screw 100 to free the sleeve 91 for rotation. The operator then rotates the sleeve 91 causing rotation of the plunger 87 through the D-shaped bore 92. The internally threaded sleeve 85 is held against rotation by the crank arm 82, so that upon rotation of the sleeve 91 and the resulting rotation of the plunger 87, the plunger 87 is reciprocated with respect to the sleeve 85, to effect adjustment of the disposition of the plunger 87 and the cutting tool actuated thereby. An end plate 102 is removably secured, as by means of screws, to the end face 103 of the housing section 18 to close the compartment or cavity 54. To lubricate the bearing 90, the plunger 87 and the assembly within the compartment 54, an oil or grease fitting 104 is fixedly positioned within the bore 94 in the sleeve 91 at the upper end thereof.

The plunger 87 is guided for reciprocal movement at its lower end by guide sleeve 110 secured in a bore 111 in the housing section 18 by means of pointed screws 112 engaging in conical recesses 113 in the sleeve 110. The compartment or cavity 54 is sealed from the interior of the sleeve 110 by means of a modified block V packing ring 114. A bearing or bushing 115 seating on a shoulder 116 provided in the bore 117 of the sleeve 110 engages the lower cylindrical portion of the plunger 87 for guiding same. A supporting sleeve 118 is rotatably mounted on the sleeve 110 by means of bearing 119. The bearings 119 are preferably balls disposed in circular races, the race for the upper bearing 119 being defined by an upper stepped bushing 120 and the lower bearing race being defined by a lower stepped bushing 121. The upper bushing is press-fit on the sleeve 110 and the lower bushing has sliding engagement with the external surfaces of the sleeve 110. The supporting sleeve 118 includes an outer body 122 and an inner sleeve 123 press-fit in a bore 124 in the body 122. The inner sleeve 123 is provided with inclined end portions engaging the balls 119. The lower bushing 121 is supported on sleeve 110 by means of a nut 125 and is provided with a pin 126 extending through a side wall thereof and engaged in a slot 127 in the sleeve 110 to prevent relative rotation between the bushing 121 and the sleeve 110, while permitting relative linear movement. The sleeve 110 is threaded at its lower end for the reception of the nut 125 and a lock nut 128, which nuts may be loosened or tightened manually by the operator of the machine to vary the distance between the bushings 120 and 121.

A washer 129 rests upon the upper surface of the lower bushing 121 and forms a lower bearing surface for a spring means 130 which is confined between the washer 129 and an integral internal flange 131 provided on the inner sleeve 123 of the supporting sleeve 118. The spring means 130 is in the form of a helical compression spring exerting force between the lower bushing 121 and the supporting sleeve 118 to maintain the sleeve 118 in coaxial relation with the plunger 87, the force of the spring being adjustable by means of the nut 128. The washer 129, spring 130, flange 131 and means for adjusting the force of the spring constitute a brake to resist swivelling of the sleeve 118 about the plunger 87, as will appear more fully hereinafter. The brake is optional and may be dispensed with if desired.

The body 123 of the supporting sleeve 118 is oblong and is provided with an integral portion 135 having a bore 136 therein, within which is received a tubular guide rod 137. A cutting tool guide member 138 is mounted on the lower end of the guide rod 137 and includes a toe 139 having a V slot 140 therein for receiving and guiding a cutter tool. The toe 139 is mounted within the guide member 138 in a manner to accommodate movement of the toe with respect to the guide. One manner of so mounting the toe is shown in the identified prior applications of W. P. Gallagher. The guide rod 137 is provided, on diametrically opposite sides, with flat portions 141 arranged to be engaged by set screws 142 (see Figure 8) to hold the guide rod 137 in the bore 136 of the body 123. An oil or grease cup 143, preferably of the wick type, is conveniently provided at the top of the body portion 135 and the guide rod 137 is provided with bores or holes adapted to conduct lubricant to the engaging surfaces of the rod and a guide sleeve 144 movably mounted on the rod.

The guide sleeve 144 is reciprocably mounted on the guide 137 for vertical reciprocation and carries an integral radial extension 145 provided with a bifurcated end 146. Intermediate the extension 145, tapped holes are provided for the reception of set screws 147 for attaching a cutting tool, such as a saw or chisel (not shown), to the sleeve 145. The plunger 87 extends downwardly from the supporting sleeve 118 and is provided at its lower end with a reduced end shouldered end portion 148 for engaging the bifurcated end portion 146 of the guide sleeve 144 to reciprocate the sleeve and the cutter carried thereby be damped to a certain extent to the plunger 87 for reciprocation therewith. In the movement of the machine over the work, the cutting tool, such as a chisel or saw blade, is reciprocated and, being eccentric to plunger 87, trails the latter. The supporting sleeve 118 is free to swing about the axis of plunger 87 in accordance with changes in direction of movement of the machine, permitting the cutting tool to follow accurately the line or pattern being cut. It is desirable that the assembly comprising the supporting sleeve 118 and parts carried thereby be damped to a certain extent in order to avoid the tendency, due to inertia, of the cutting tool to swing in either direction beyond the line or pattern which it should follow. To that end, we preferably provide the brake means, comprising the spring means 130 and the elements cooperating therewith, to provide a desirable braking effect which retards the free swinging movement of the sleeve 118 about the sleeve 110 for the purpose stated.

In practice, the work is placed upon a suitable support and the machine is moved over the work in such manner as to move the cutting tool along a line or pattern to which the material or work is to be cut. When the chisel or other cutting tool is out of the work, it is in vertical position perpendicular to the work. When the cutting tool enters the work on its downstroke, however, in the continued forward movement of the machine along the cutting line, the cutting tool is caused to assume an inclined position. To permit of that, the toe 139 of the tool guide member 138 is mounted for movement within the member 133 so that the toe may move away from the reciprocating plunger 87, substantially radially of the latter. When the tool is again withdrawn from the work on the upstroke of the plunger, the toe 139, and with it the cutting tool, is returned to normal position in which the tool is vertically disposed and then follows the succeeding or cutting stroke of the cutting tool. The ability of the tool to assume an inclined position, when subjected to outward pressure resulting from continued movement of the machine when the chisel is in the work, avoids subjecting the cutting tool to objectionable stresses with resulting bending or breakage thereof, while permitting movement of the machine over the work at increased speed and with increased smoothness, which increases the efficiency of the machine.

The construction provided by the present invention particularly facilitates the assembly and disassembly of the operating mechanism and the various elements thereof. If the plunger 87 is damaged or becomes worn during operation of the machine, it is readily removed and replaced by removing the cover plate 102, sliding the pin 89 out of the plunger and rotating the sleeve 91 until the threaded portion of the plunger is disengaged from the threaded sleeve 85. The screws 142 are loosened to free the guide rod 137 for movement with respect to the portion 135. Then the plunger 87 and the guide rod 137 can be freely removed, slidingly, from the members supporting and guiding them, in the direction of the bottom of the machine. The pin 82 on the threaded sleeve 85 now can be removed from the bore 83 in the crank arm 82 to expose the eccentric slide and counterweight assembly. The brake assembly is readily disassembled for repair or replacement of parts by removal of the nuts 125 and 128. The bearing 90 and the sleeve 91 are readily removed upon removal of the screw 98. Thus it is seen that entire disassembly is readily effected with relatively few manipulations. It will be apparent that assembly of the mechanism is just as readily effected in an order reverse of that of disassembly.

From the foregoing description and the accompanying drawings, it will be apparent that the machine of the present invention provides improved and simplified operating mechanisms of economical manufacture. In particular, the present invention provides a cutting machine in which all adjustments pertaining to the action of the cutting tool may be readily effected from the exterior of the machine, without the necessity for disassembling any of the parts or elements of the machine. The present invention provides, in the form of the eccentric slide and counterweight assembly, a convenient and economical means for readily adjusting and varying the stroke of the cutting blade from the exterior of the machine. The present invention also provides, in the form of the threaded sleeve 85, the threaded plunger 87 and the sleeve 91 for rotating the plunger, a convenient and economical means for readily varying and adjusting the disposition of the plunger and cutting blade from the exterior of the machine. In addition, the present invention provides, in the form of the sleeve 118 and associated apparatus, a convenient and economical means for braking the tendency of the supporting sleeve 118 to rotate with respect to the actuating plunger 87.

While we have described and shown a preferred embodiment of our invention, it will be apparent that modifications and variations can be made in the preferred structure without departing from the scope of the present invention, as defined by the appended claims.

We claim:

1. A cutting machine comprising a rotary crank, means for rotating said crank, a first sleeve pivotally connected to said crank, a plunger threaded to said sleeve and guided for reciprocal movement, a cutting tool operatively associated with said plunger for reciprocation therewith, and a second sleeve within which said plunger is guided for reciprocal movement, said second sleeve having portions engaging said plunger to connect said plunger and second sleeve for conjoint rotational movement while permitting relative linear movement, said second sleeve and plunger being conjointly rotatable relative to said first sleeve upon manual actuation of said second sleeve to vary the disposition of said plunger and said tool with respect to said first sleeve and said crank.

2. A cutting machine comprising a rotary crank, means for rotating said crank, a sleeve pivotally connected to said crank, a plunger threaded to said sleeve and guided for reciprocal movement, a cutting tool operatively associated with said plunger for reciprocation therewith, and a second sleeve within which said plunger is guided for reciprocal movement relative to said second sleeve, said plunger having an irregular cross section throughout a portion thereof engaged in said second sleeve, said second sleeve having a bore of irregular cross section complementary to the irregular cross section of said plunger to prevent relative rotation between said plunger and said second sleeve, whereby said plunger is rotatable by means of said second sleeve with respect to said first named sleeve to vary the disposition of said plunger and said tool with respect to said first named sleeve and said crank.

3. A cutting machine comprising a rotary crank, means for rotating said crank, a sleeve pivotally connected to said crank, a plunger threaded to said sleeve and guided for reciprocal movement, a cutting tool operatively associated with said plunger for reciprocation therewith, a second sleeve within which said plunger is guided for reciprocal movement relative to said secoid sleeve, said plunger having an irregular cross section throughout a portion thereof engaged in said second sleeve, said second sleeve having a bore of irregular cross section complementary to the irregular cross section of said plunger to prevent relative rotation between said plunger and said second sleeve, whereby said plunger is rotatable by means of said second sleeve with respect to said first named sleeve to vary the disposition of said plunger and said tool with respect to said first named sleeve and said crank, and means for locking said second sleeve against rotation when a desired adjustment of said plunger has been effected.

4. A cutting machine comprising a rotary crank, means for rotating said crank, a sleeve pivotally connected to said crank, a plunger threaded to said sleeve and guided for reciprocal movement, a cutting tool operatively associated with said plunger for reciprocation therewith, a second sleeve within which said plunger is guided for reciprocal movement relative to said second sleeve, said plunger having an irregular cross section throughout a portion thereof engaged in said second sleeve, said second sleeve having a bore of irregular cross section complementary to the irregular cross section of said plunger to prevent relative rotation between said plunger and said second sleeve whereby said plunger is rotatable by means of said second sleeve with respect to said first named sleeve to vary the disposition of said plunger and said tool with respect to said first named sleeve and said crank, means for locking said second sleeve against rotation when a desired adjustment of said plunger has been effected, an eccentric slide assembly forming part of said rotating means for varying the eccentric throw of said crank to vary the stroke of said plunger, and means for locking said eccentric slide assembly in any one of a plurality of adjusted positions.

5. A cutting machine comprising a cutting tool, a plunger operatively connected at one end to said tool, said plunger having a threaded portion intermediate its ends, a sleeve threaded on said threaded portion of said plunger, rotary crank means operatively connected to said sleeve for reciprocating said sleeve and plunger, and a second sleeve fixed against linear movement and within which the other end of said plunger is reciprocably guided, said second sleeve being operatively associated with said other end of said plunger for conjoint rotational movement and relative linear movement, said second sleeve being rotatable to effect rotation of said plunger with respect to said first named sleeve to vary the disposition of said plunger and said tool with respect to said first named sleeve and said crank means.

6. In a cutting machine, a cutting tool, means for reciprocating said tool including a reciprocating plunger, a bearing member guiding said plunger, a body rotatably mounted on said bearing member, a guide rod secured to said body, said guide rod extending parallel to but spaced from said plunger, a tool carrier slidably mounted on said rod and carrying said tool, said tool carrier having a portion operatively associated with said plunger for reciprocation therewith, and means resisting rotation of said body about said bearing member, said last named means including resilient means exerting force longitudinally of said plunger between said bearing member and said body to effect a braking action between mating surfaces of said bearing member and said body.

7. A cutting machine comprising a cutting tool, means for reciprocating said tool including a plunger, a guide sleeve surrounding said plunger and guiding same for reciprocal movement, a first bearing mounted on said sleeve, a second bearing slidably mounted on said sleeve, said bearings presenting opposed bearing surfaces, a tool supporting sleeve surrounding said guide sleeve, said supporting sleeve presenting portions arranged to contact said bearings to rotatably support said supporting sleeve on said guide sleeve, said supporting sleeve having an internal flange spaced from each of said bearings, resilient means compressed between said flange and said second bearing to force said supporting sleeve against said first bearing to resist rotation of said supporting sleeve, and means for sliding said second bearing on said guide sleeve to vary the compressive force of said resilient means and thusly the braking effect of the engagement between said supporting sleeve and said first bearing.

8. A cutting machine comprising a cutting tool, means for reciprocating said tool including a plunger, a guide sleeve surrounding said plunger and guiding same for reciprocal movement, a first bearing mounted on said sleeve, a second bearing slidably mounted on said sleeve, said bearing presenting opposed bearing surfaces, a tool supporting sleeve surrounding said guide sleeve, said supporting sleeve presenting portions arranged to contact said bearings to rotatably support said supporting sleeve on said guide sleeve, said supporting sleeve having an internal flange spaced from each of said bearings, resilient means compressed between said flange and said second bearing to force said supporting sleeve against said first bearing to resist rotation of said supporting sleeve, said guide sleeve having a threaded portion adjacent said second bearing, and a nut threadably mounted on said threaded portion of said guide sleeve for effecting sliding movement of said second bearing along said guide sleeve to vary the compressive force of said resilient means and thusly the braking effect of the engagement between said supporting sleeve and said first bearing.

9. In a cutting machine, a cutting tool, means for reciprocating said tool, said means comprising a plunger guided for reciprocal movement and operatively associated with said tool, said plunger having a threaded portion, a sleeve threaded to said threaded portion of said plunger, rotary crank means operatively associated with said sleeve for reciprocating said sleeve and plunger and for preventing rotation of said sleeve, and manually operable means for rotating said plunger to vary the disposition of said plunger and said tool with respect to said sleeve and said crank means, a bearing member guiding said plunger for reciprocal movement, a body rotatably mounted on said bearing member, a guide rod secured to said body, said guide rod extending parallel to but spaced radially from said plunger, a tool carrier slidably mounted on said rod and carrying said tool, said tool carrier having a portion operatively associated with said plunger for reciprocation therewith, and means damping rotation of said body about said bearing member, said last named means including resilient means exerting force longitudinally of said plunger between said bearing member and said body to effect a braking action between mating surfaces of said bearing member and said body.

10. In a cutting machine, a housing having a compartment, an interiorly threaded sleeve in said compartment restrained against rotation, means for reciprocating said sleeve, a reciprocatory plunger extending into said compartment and threaded through said sleeve for reciprocation therewith and for relative rotation and resultant lengthwise movement, said plunger extending outward beyond said compartment at the bottom of the latter and extending upward beyond said sleeve, and a second sleeve rotatably mounted at the upper portion of said housing having sliding and non-rotative connection to the upper portion of said plunger effective for rotating the latter in either direction and thereby adjusting it lengthwise relative to said sleeve.

WILLIAM P. GALLAGHER.
CURT J. COURANT.

REFERENCES CITED

The following references are of record in the file of this patent:

UNITED STATES PATENTS

| Number | Name | Date |
|---|---|---|
| 431,998 | Salisbury | July 8, 1890 |
| 1,136,842 | Siegel | Apr. 20, 1915 |
| 1,949,509 | Woodward | Mar. 6, 1934 |
| 1,955,350 | Sweet et al. | Apr. 17, 1934 |
| 1,974,642 | Colby | Sept. 25, 1934 |
| 2,239,287 | Gallagher | Apr. 22, 1941 |